June 2, 1942.　　　G. W. HILEY　　　2,285,090

SPRING TESTER

Filed Nov. 20, 1939

Inventor

G. W. Hiley

By Mason Fenwick & Lawrence
Attorneys

Patented June 2, 1942

2,285,090

UNITED STATES PATENT OFFICE 2,285,090

SPRING TESTER

Gies W. Hiley, Smithboro, N. Y.; Goldie E. Hiley administratrix of said Gies W. Hiley, deceased Application November 20, 1939, Serial No. 305,366

1 Claim. (Cl. 265—14)

This invention relates to spring testers and particularly to testers for coil springs such as are used for valves.

Spring testers of hydraulic type have been proposed but difficulties are encountered in producing hydraulic spring testers that are both portable and rugged. It is desirable that the tester be compact and as free as possible from external attachment. It is desirable also that moving parts within the tester be accurate. Further, it is desirable to provide for compensation of differences and irregularities that may exist between different individual testers, to permit such testers to be produced by mass production methods. It is desirable to arrange for compensation against irregular changes due to atmospheric temperature. For example in Summer added expansion of liquid raises the pressure within the tester, but this is complicated by expansion of metal of which the tester may be composed. Similarly, in Winter low temperatures also effect the accuracy of the tester. A further difficulty that arises in many hydraulic testers is associated with movement of a piston within the tester. A piston extending through packing glands of one sort or another causes wear and ensuing leakage tends to render the apparatus inaccurate. This is accentuated where pistons of simple nature have entailed considerable extent of movement of the piston.

This invention proposes to overcome these difficulties. An object is to produce a portable spring tester of parts that may be produced cheaply without machining and yet be accurate. Further, an object is to produce a portable tester that may be set up readily in standard apparatus available in garages where valve springs are to be tested. These objects and the object of producing a form of tester that is adapted to inexpensive and large scale methods of production will be apparent in the following illustrative description of this invention. Other objects likewise will appear in the description. The accompanying drawing illustrates a preferred embodiment of this invention and essential novel features are pointed out in the appended claim.

Figure 1:
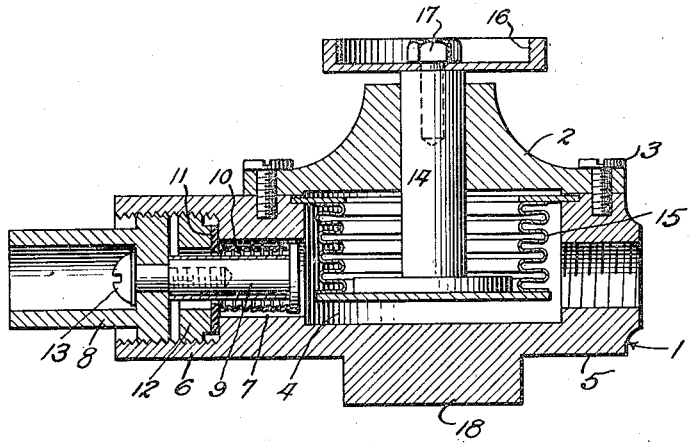
Figure 1 shows this spring tester in adjacent vertical sections taken along intersecting radial lines.

This invention may be embodied in a cup-like base covered tightly to contain liquid, with bellows operated in the liquid by a spring to be tested. Openings for liquid communicate between the bellows and a pressure gauge and a pressure regulator inserted in the base. In preferred embodiment, the bellows is sealed tightly to a top on the oil cup to prevent oil from leaking. Further, the pressure regulator is adjustable within a substantial bore within the side of the oil chamber.

This invention may be illustrated by more particular reference to the form shown in the drawing, though it is to be understood that this invention is not restricted thereto and may be practiced in other forms than are there illustrated.

Figure 2:
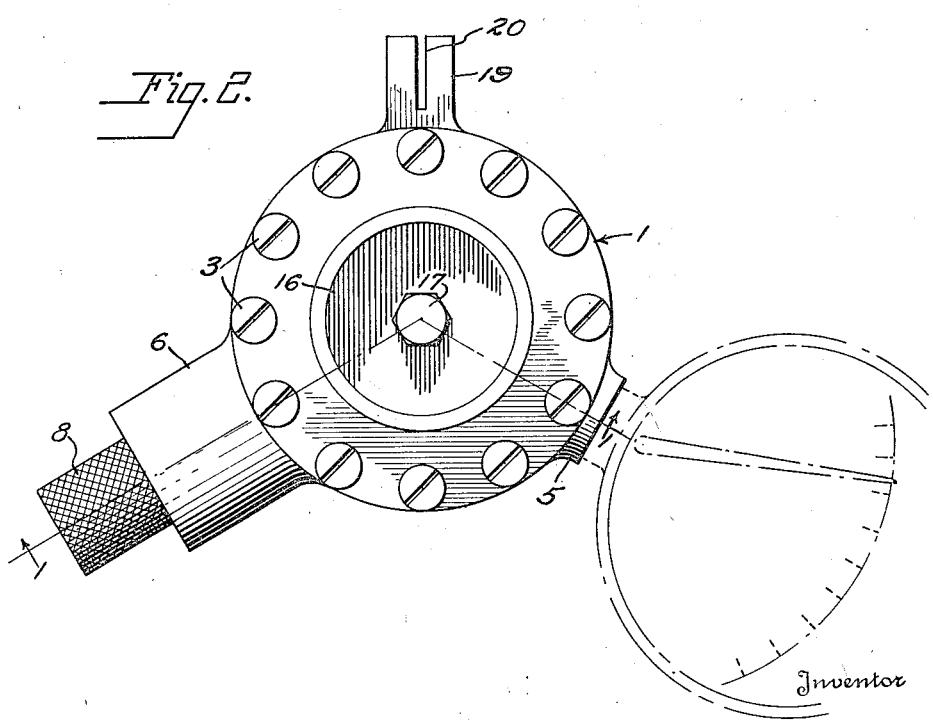
Figure 2 is a plan view of the apparatus shown in Figure 1.

With reference to the drawing, this invention comprises a cup 1 to which is rigidly secured a tight fitting top 2, as by screw bolts 3. This defines a chamber 4. The cup 1 is of a form to be cast or pressed in resin or rubber or metal, and therefore produced quickly and inexpensively. The walls are sturdy to withstand oil pressure even to several hundred pounds per square inch, but the side walls are enlarged at two positions 5 and 6 as illustrated in Figure 2. These positions are angularly disposed to each other as illustrated in Figure 2. The wall portion 6 extends slightly as an arm to constitute a slight enlargement 7 of the chamber. These two portions of the wall 5 and 6 are bored and threaded. The portion 5 is adapted to receive the threaded arm of a pressure gauge of conventional type. The projecting side chamber 7 is adapted to receive a screw-threaded plug 8 which carries at its inner end an element to project into the side chamber 7 for displacing more or less liquid as the plug is adjusted and thus to regulate the basic pressure imposed on the gauge.

In the form shown, the adjustment plug 8 is a hollow rod threaded at its inner end into the arm 6. At the inner end of this plug 8 is secured a supplemental plug 9 to project into the liquid chamber 7. As shown, this inward plug 9 is fitted within a small bellows 10. Surrounding the bellows 10, the inner chamber 7 is of somewhat smaller diameter than the outer portion of the bore so as to provide a shoulder upon which to seat a gasket 11, or upon which to solder a suitable shoulder for fitting the bellows 10 with a fluid-tight fit. In the absence of bellows the inner plug 9 may extend through a suitable packing gland. As shown in the drawing, a packing 12 is screwed down against a gasket 11. To adjust the plug and bellows 9 and 10, a stud bolt 13 is projected through the inner end of adjusting plug 8 and screwed into the inner plug 9. The adjusting plug 8 rotates freely about this bolt 13 and thus moves the inner plug 9 and bellows 10 inwardly and outwardly to displace more or less liquid from the side chamber 7.

Extending into the principal liquid chamber 4 is a rod 14 secured at its inner end to a telescoping element, for example, bellows 15. This rod 14 is mounted for vertical movement through the cover 2 of the oil chamber. At its upper end rod 14 carries a recessed table 16 to constitute a pedestal for a coil spring to be tested. To facilitate manufacture and assembly and also to provide accommodation to different sizes of coil springs, the table 16 may be mounted by a screw bolt 17 into the top of the rod 14 with or without being screwed upon the upper end of rod 14. Moreover, table 16 is mounted near the cover 2 at distances to act as a stop against such extended downward movement of the rod 14 as would injure the bellows 15. This distance is adapted to permit sufficient movement of various springs for testing.

The lower portion of the cup 1 is extended to constitute a plug 18 to fit and steady the cup in a suitable receptacle, such as the base of an arbor press.

It is desirable also to attach to the side of cup 1 a foot piece 19 containing a slot 20. This is adapted to receive a ruler-like measuring element to extend upwardly along the spring under test. Thus, linear displacement of the spring may be measured immediately for correlation to the change in pressure with the displacement.

Although I have described this invention in accordance with the patent statutes and have illustrated its principles by reference to a practice that is at present preferred, it will now be apparent to those skilled in this art that alterations and changes of detail are possible within the scope of the appended claim.

What I claim is:

In a spring tester, a pressure gauge, a body having a cavity and a radially disposed boss provided with a bore communicating with the cavity, a liquid tight bellows positioned in said bore, means carried by the boss for adjusting said bellows to modify the capacity of the cavity, a second liquid tight bellows having an annular flange around an open end, a top adapted to seat on the body over the second bellows flange to seal the cavity with said bellows positioned therein, said top having a centrally positioned bore, means securing the top to the body, a spring centering cup having a stem slidable in the bore and engaging the bottom of the bellows and means for communicating the cavity with the pressure gauge whereby a liquid filling said cavity around the bellows therein will transmit variations in expansion of said bellows to the gauge.

GIES W. HILEY.